United States Patent [19]

MacMunn et al.

[11] 4,195,347
[45] Mar. 25, 1980

[54] BUFFER APPARATUS FOR ARTICLE PROCESSING SYSTEMS

[75] Inventors: George D. MacMunn, Southfield; Shelden M. Kavieff, Farmington Hills, both of Mich.

[73] Assignee: Jervis B. Webb Company, Farmington Hills, Mich.

[21] Appl. No.: 916,823

[22] Filed: Jun. 19, 1978

[51] Int. Cl.² ............... G06F 15/46; B65G 1/06
[52] U.S. Cl. .................. 364/478; 414/273; 414/281
[58] Field of Search ............ 364/478, 200 MS File, 364/900 MS File; 214/11 R, 11 C, 16 R, 16 B, 16.4 R, 16.4 A

[56] References Cited

U.S. PATENT DOCUMENTS

| | | | |
|---|---|---|---|
| 3,595,412 | 7/1971 | Billingsley et al. | 214/16.4 A X |
| 3,690,479 | 9/1972 | Castaldi | 214/16.4 A |
| 3,737,056 | 6/1973 | Hathcock, Jr. | 214/16.4 A |
| 3,831,197 | 8/1974 | Beach et al. | 214/16.4 A X |
| 4,053,741 | 10/1977 | Ainoya et al. | 364/478 |

Primary Examiner—Joseph F. Ruggiero
Attorney, Agent, or Firm—Joseph W. Farley

[57] ABSTRACT

A system for providing a buffer between upstream and downstream article processing lines employs a storage and retrieval machine operable in a storage mode to store in a matrix of storage bins unit loads of articles received from the upstream line during an interruption in the processing rate of the downstream line; and, operable in a retrieval mode to supply the stored articles to the downstream line when required. The storage machine includes separately driven components consisting of a horizontally movable carriage, a vertically movable elevator mounted on the carriage, and a bi-laterally movable load carrying table mounted on the elevator. Movements of these components are regulated by a control which counts the number of unit loads in storage and computes, in accordance with predetermined storage and retrieval sequences, the location in the matrix of the storage bin for the next storage or retrieval operation and directs the machine table to that location. In the storage mode, each successive storage operation of the machine is initiated in response to the presence of a group of articles, or unit load, at a transfer station located adjacent the entrance to the downstream line; and, in the retrieval mode, each successive operation of the machine occurs in response to the deposit of a unit load on the transfer station by the table of the machine.

17 Claims, 21 Drawing Figures

BUFFER APPARATUS FOR ARTICLE PROCESSING SYSTEMS

This invention relates to an article processing system involving successive processing operations and to improved apparatus for providing a buffer which at least in part protects an upstream processing operation from being affected by variations in the production rate of a successive downstream operation, and vice versa.

As an example of the utility of the invention, the manufacture of a particular article may require a number of machining operations which are carried out in successive machines, each equipped to perform a certain group of the operations, and each group of operations must be performed before an article is in condition to be received by a successive machine. Many factors can cause interruptions in the operation of successive machines, or variations in their respective production rates, and therefore it is desirable to accumulate a number of articles between successive machines so that an interruption in the operation of one will not immediately cause any interruption in the operation of another. Space restrictions frequently prevent the accumulation of a number of articles adequate to compensate for even normal production interruptions.

The overall object of the present invention is to provide, in an article processing system involving successive processing operations, a buffer apparatus between these operations, the buffer apparatus enabling a relatively large number of articles to be stored and accumulated in a minimum space at times when the production rate of the downstream processing operation is less than the production rate of the upstream processing operation and which enables articles to be withdrawn from storage when the production rate of the downstream operation exceeds that of the upstream operation.

The improved apparatus comprises an article storing device having a plurality of storage bins for receiving and accumulating unit loads of articles, the storage bins being preferably arranged in horizontal and vertical rows defining a matrix having a plurality of vertical columns and horizontal storage levels. A transfer means is arranged between the first and second processing operations and includes an article storing and retrieving machine for storing unit loads of articles in and retrieving unit loads of articles from the storage bins.

The basic components of this storing and retrieving machine (hereinafter referred to as "storage machine") are conventional and include a horizontally movable carriage, a vertically movable elevator mounted on the carriage, a transversely movable load carrying table mounted on the elevator, and individual drive motors for the carriage, the elevator and the table.

Control means is provided for operating the storage machine in a storage mode in which unit loads of articles are successively placed in the storage bins, and in a retrieval mode in which unit loads of articles are removed from the storage bins in accordance with supply and demand conditions of the processing operations.

Preferably, the transfer means also includes a transfer station at which a plurality of articles are supported and grouped for handling by the storage machine in unit loads rather than being handled individually, thereby reducing the number of storage and retrieval operations of the machine required to handle a given number of articles. The control means for operating the machine is made responsive to the presence of a group of articles, or unit load, at the transfer station in order to initiate a storage operation.

Both the storage and retrieval operations of the machine are controlled automatically. The control means includes a programmable device for calculating, in both the storage and retrieval modes of operation, the column and level address of the next storage bin (preferably in a predetermined sequence of storage bins) as functions of a unit load number, supplied from an external source or determined by counting means, and the number of storage bins in one of the horizontal or vertical rows of the storage device. For example, in the case of a predetermined sequence of loading the storage bins consecutively in each vertical column, then the second number employed in the calculation performed by the programmable means is the number of storage bins in each vertical column of the storage device.

The storage machine is provided with means for detecting the positions of the carriage and elevator relative to the columns and storage levels of the storage device and the control means compares the detected column and level positions with the calculated column and level address, producing output signals for controlling the motors which drive the machine components when the detected address corresponds with the calculated one. Each column and storage level of the storage device is indicated by a magnetic code card detectable by code card readers on the machine, and preferably these code cards may each have a unique code combination for more positive identification.

Other features and advantages of the invention will appear from the description to follow of the presently preferred embodiments disclosed in the accompanying drawings.

DESCRIPTION OF THE PREFERRED EMBODIMENTS

Figure 1:
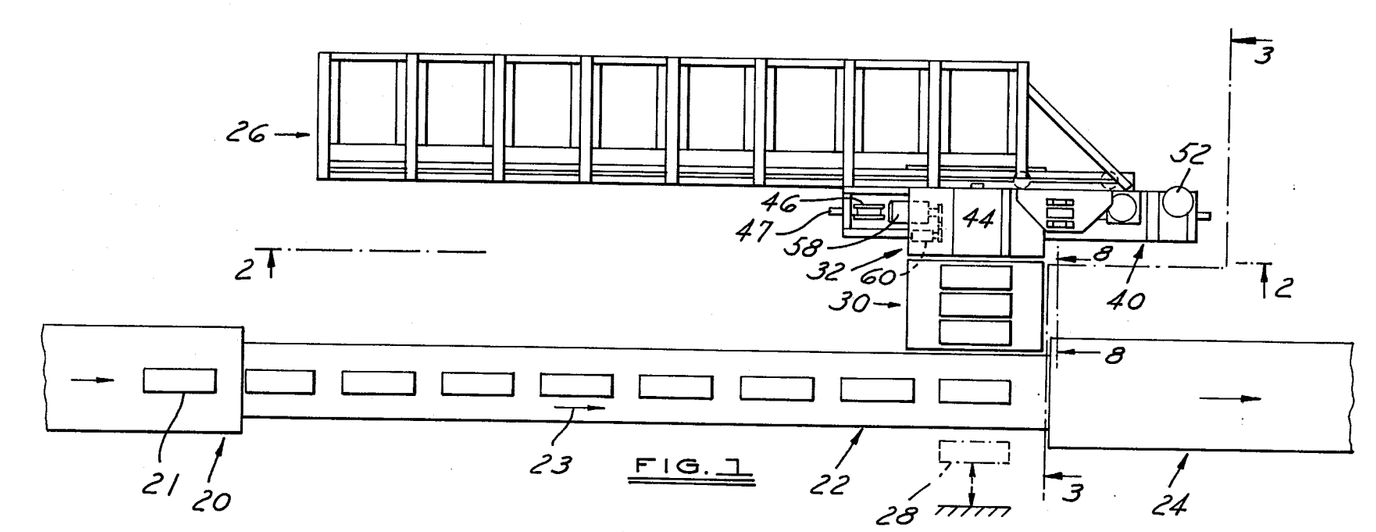
FIG. 1 is a plan view, partly schematic, illustrating an article processing system of the invention.

The plan view, FIG. 1, shows a representative example of an article processing system arranged in accordance with the invention. A first processing means 20 normally delivers articles 21 to a suitable conveying means 22 which moves the articles in the direction indicated by the arrows 23 to a second processing means 24. These components are shown schematically since the processing means 20 and 24 may be transfer machines, assembly lines or any type of conventional apparatus employed industrially in the manufacture and processing of the articles, and the conveying means 22 will likewise take any form suitable for handling the particular articles being processed. Such conveying means 22 represents a conventionally employed device for providing a bank of articles between the processing means 20 and the successive processing means 24. FIG. 1 depicts a condition in which the processing means 24 is unable to receive articles 21 from the conveyor 22—for example, if the processing means 24 is assumed to be a machining line or transfer machine, it may be shut down for routine tool changing.

In the processing system of the invention and with the downstream processing means 24 inoperative as shown, means is provided for transferring articles from the conveying means 22 to a storage device 26; and, in the embodiment shown, the transfer means includes a suitable diverter or deflector 28, a transfer station 30 and a storage machine 32. The deflector 28 is also illustrated schematically, since the nature of this device will depend upon the nature of the conveying means 22 and upon the characteristics of the articles 21 being processed.

Figure 2:
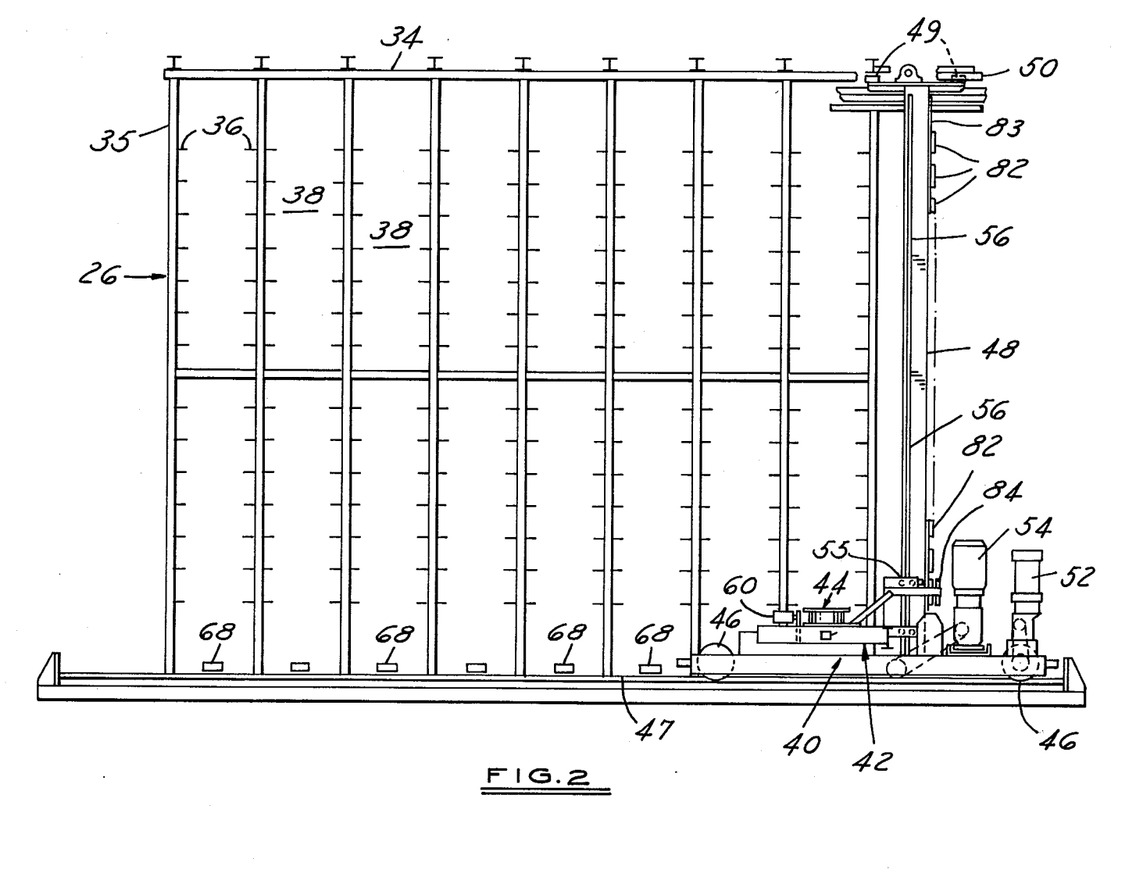
FIG. 2 is an elevation, taken as indicated by the line 2—2 of FIG. 1, showing the storage bins and the storage machine of the system of FIG. 1.
Figure 3:
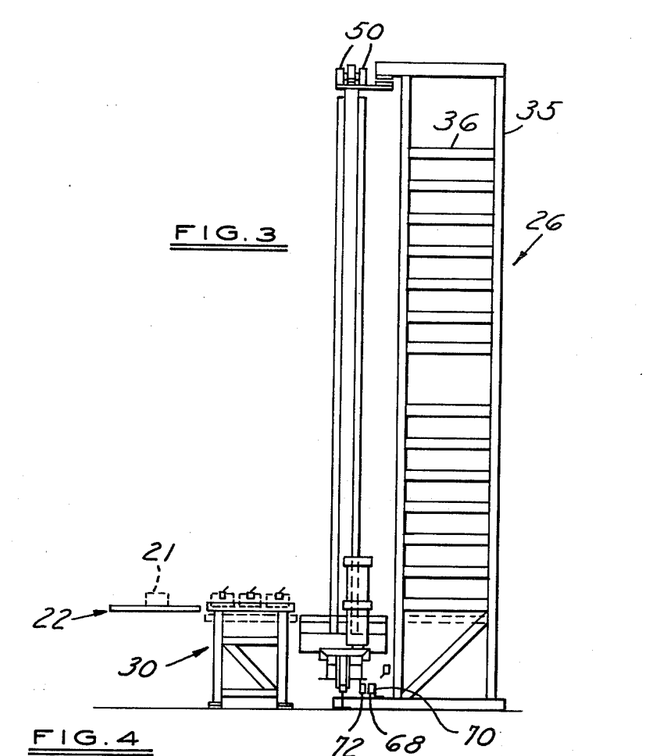
FIG. 3 is a transverse elevation, taken as indicated by the line 3—3 of FIG. 1.

FIGS. 2 and 3 further illustrate the construction of the storage device 26 and the storage machine 32. The storage device 26 consists of a framework of horizontal members 34 and vertical members 35 which carry article supporting members 36 providing a plurality of storage bins 38. Preferably, the storage device 26 is in the form of a matrix in which the storage bins 38 are arranged in vertical and horizontal directions defining a plurality of vertical columns each having a number of horizontal levels.

The basic components of the storage machine 32 (FIGS. 1–3) are conventional and include a horizontally movable carriage 40, a vertically movable elevator 42 mounted on the carriage, and a transversely movable article carrying table 44 mounted on the elevator. The carriage 40 is supported by a pair of wheels 46 mounted on a rail 47 and has an upstanding mast 48 equipped at its upper end with guide rollers 49 engaging a pair of guide tracks 50. One of the wheels 46 is driven by a reversible carriage drive motor 52. An elevator drive motor 54 mounted on the carriage moves the elevator vertically along the mast 48, the elevator being equipped with vertically spaced pairs of guide rollers 55 which engage a pair of guide rails 56 on the mast 48. Details of this construction are further shown in FIGS. 10 and 11.

The article carrying table 44 is so constructed and arranged that it can be extended transversely to either side of the elevator 42 by operation of a table drive motor 58 (FIG. 1), with extending and retracting movements of the table being controlled by a rotary type of cam switch 60 driven from the table drive motor 58, as shown in FIGS. 1 and 2. This type of bilaterally extendable article carrying table 44 is well known, and further details of such a construction may be found in U.S. Pat. No. 3,402,835 to which reference may be made for further details.

Figures 5, 6, 6A, 7, 7A, 8, 9:
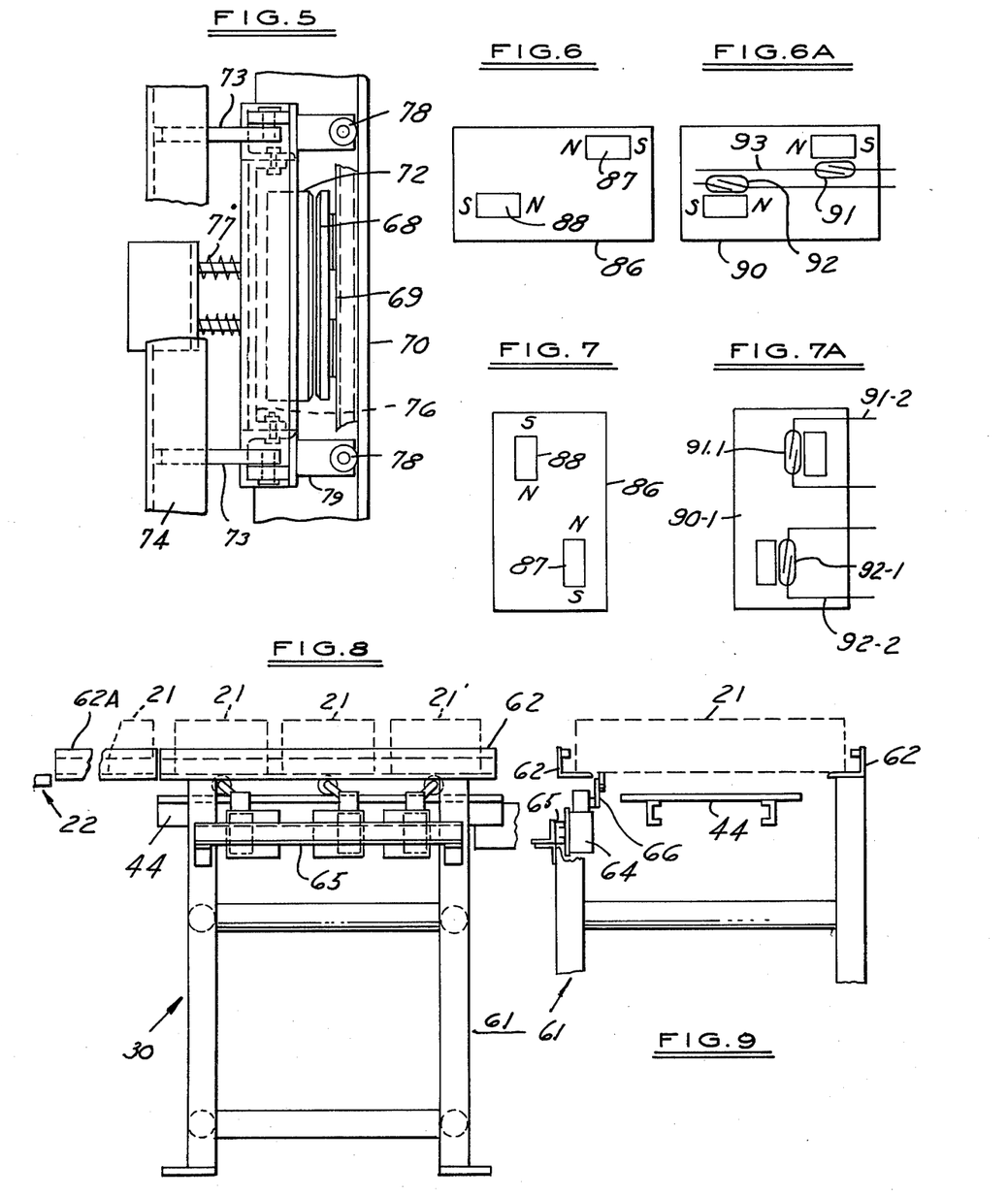
FIG. 5 is a plan view taken on the line 5—5 of FIG. 4 showing a column code card and reader.
FIG. 6 is a plan view schematically illustrating one form of column code card.
FIG. 6A is a plan view schematically illustrating a reader for the code card of FIG. 6.
FIG. 7 is a plan view schematically illustrating one form of level code card.
FIG. 7A is a plan view schematically illustrating a reader for the code card of FIG. 7.
FIG. 8 is a side elevation taken as indicated by the arrows 8—8 of FIG. 1 and showing an article transfer station.
FIG. 9 is a fragmentary end elevation of the transfer station of FIG. 8.

FIGS. 8 and 9 illustrate the construction of the transfer station 30 which is provided for the purpose of collecting a plurality of articles 21 diverted from the conveyor means 22 into a group or unit load for handling by the storage machine 32. A suitable frame 61 supports a pair of article carrying members 62 between which the table 44 of the storage machine 32 can be extended below articles 21 supported on the members 62; and, article sensing means such as switches 64, each having an operating arm 66 engageable by an article, are adjustably mounted on a channelshaped member 65 attached to the frame 61, there being one sensing switch 64 for each article of a group which constitutes a unit load.

Preferably, as shown in FIG. 8 but not in FIGS. 1 and 3, the article carrying members 62 (or other suitable means of article support) are extended as indicated at 62A to provide means at the transfer station for supporting one or more articles 21 in excess of the number of articles in a unit load. Such provision for an additional article or articles results in greater flexibility of the processing system and enables a more uniform flow of articles from and to the lines 20 and 24 in accordance with their supply and demand conditions rather than in accordance with the variable rates at which unit loads can be stored in and retrieved from the storage device 26.

Figure 4:
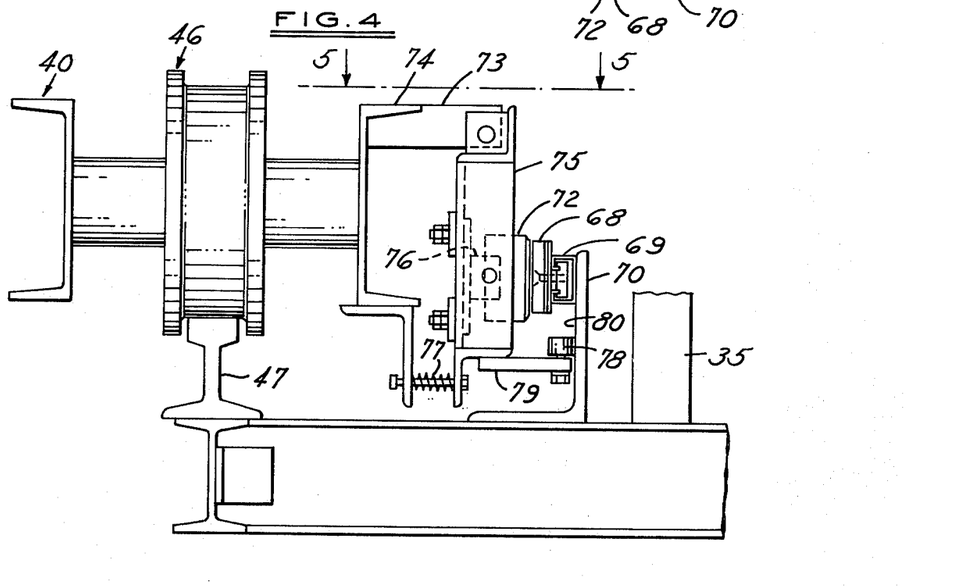
FIG. 4 is an enlarged framentary view of the lower portion of the storage and retrieval machine, including the supporting rail on which it travels.

A system of code cards is employed to indicate the location, or address, of each storage bin 38 in the matrix of the storage device 26. As shown in FIGS. 2 and 4, column code cards 68 are centered at the bottom of each column of the matrix and are attached to a channel-shaped member 69 mounted on a longitudinally extending support member 70, as shown in FIGS. 4 and 5. These column code cards 68 are detected by a sensing means or code card reader 72 mounted on the carriage 40 of the machine. A pair of arms 73 attached to a frame member 74 of the carriage 40 pivotally support a bracket 75, and the code card reader 72 is attached to a supporting member 76 carried by this bracket. The bracket 75 is resiliently urged toward the code card support member 70 by a pair of springs 77 and a pair of guide rollers 78 mounted on carrying members 79 attached to the bracket 75 bear against the vertical surface 80 of the code card support member 70. This mounting ensures accurate relative positioning of the code card reader 72 relative to the code cards 68, and compensates for side sway of the carriage in moving along the rail 47.

Figure 10:
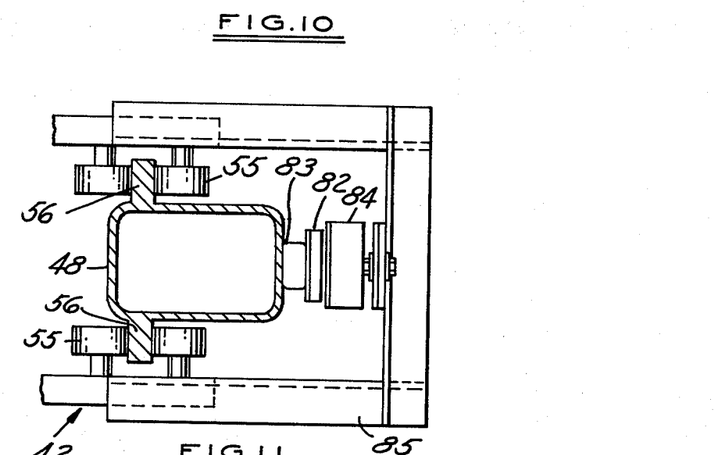
FIG. 10 is an enlarged sectional plan view taken through the mast of the storage machine and showing a portion of the elevator frame and the relation between a level code card and code card reader.
Figure 11:
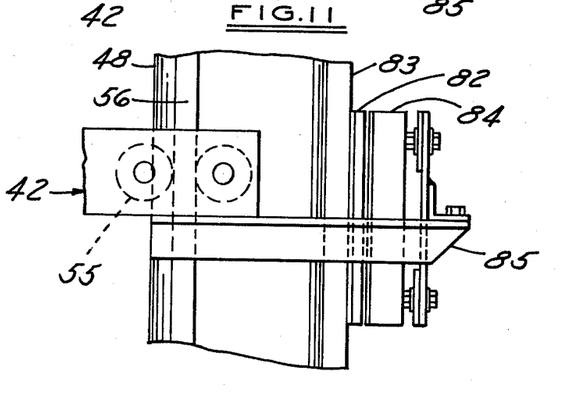
FIG. 11 is a side elevation of the structure shown in FIG. 10.

Level code cards 82 are attached to the carriage mast 48 at the level of each storage bin 38, as shown generally in FIG. 2; and, as shown in detail in FIGS. 10 and 11, each code card 82 is clamped to a channel-shaped member 83 extending lengthwise of the mast 48. A level code card reader 84 is supported by a bracket 85 attached to the structure of the elevator 42 as shown in FIGS. 10 and 11.

One form of column and level code card construction is shown in FIGS. 6 and 7 respectively, and consists simply in a rectangular piece of non-magnetic material 86 provided with suitable recesses in which a pair of permanent magnets 87 and 88 are secured. This form of code card construction may be used in one type of control system (hereinafter described) for both the column code cards 68 and the level code cards 82, and is detected by column level readers constructed as shown in FIGS. 6A and 7A.

The column code card reader of FIG. 6A includes a rectangular plate 90 of non-magnetic material on which a pair of polarized reed switches 91 and 92 are mounted in positions corresponding to those of the magnets 87 and 88 of the code card shown in FIG. 6, and are electrically connected in a series circuit 93 so that this is completed only when both of the reed switches 91 and 92 are simultaneously operated by the magnets 87 and 88. Precise positioning of the storage machine carriage 40 at a column can be obtained by adjusting the overlapping operation of the reed switches 91 and 92.

In the level code card reader of FIG. 7A, a polrized reed switch 91-1 is mounted on the non-magnetic plate 90-1 in a position such as to be operable by the magnet 87 of the code card of FIG. 7, a polarized reed switch 92-1 is mounted on the plate 90-1 so as to be operable by the magnet 88, and each of the reed switches 91-1 and 92-1 are connected in a separate electrical circuit 91-2 and 92-2, respectively. As a result, the switch 91-1 is employed to detect the magnet 87 of the level code cards when the machine is operating in the retrieval mode and the other reed switch 92-1 is employed to detect the magnet 88 when the machine is operating in the storage mode. This selective operation of the reed switches 91-1 and 92-1 for the level code card reader enables the elevator of the storage machine to be stopped at higher levels for storage operations and at lower levels for retrieval operations.

Figures 12, 12A, 13:
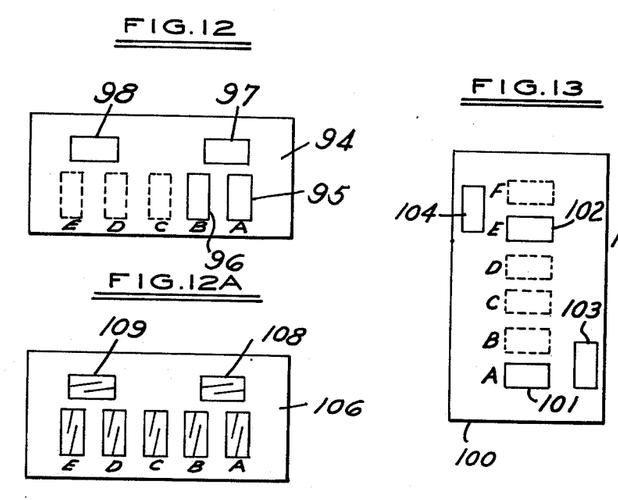
FIG. 12 is a plan view schematically illustrating an alternative form of column code card.
FIG. 12A schematically illustrates a reader for the code card of FIG. 12.
FIG. 13 is a plan view schematically illustrating an alternative form of level code card.

An alternative form of a column code card construction is shown in FIG. 12 and an alternative form of a level code card construction is shown in FIG. 13. In FIG. 12, a non-metallic mounting plate 94 is provided with a series of magnet receiving slots arranged in positions marked A–E. A pair of permanent code magnets 95 and 96 are mounted in a selected pair of these slots A–E for each column code card in accordance with the column codes shown in FIG. 15, code positions A and B being illustrated in FIG. 12. Each column code card is also provided with a pair of read-now command magnets 97 and 98 mounted on the plate 94 in transversely spaced relation to the magnets 95 and 96.

Figure 15:
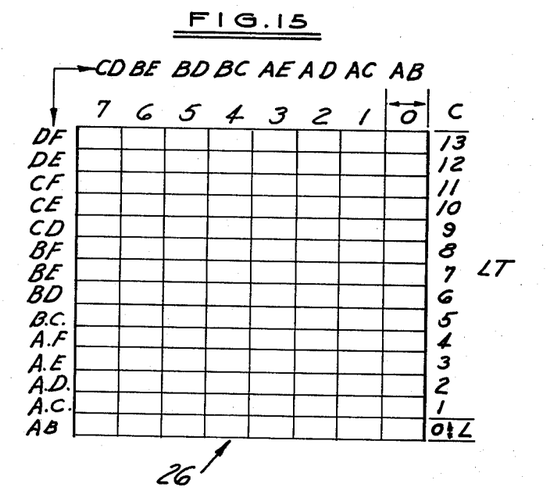
FIG. 15 is a schematic diagram showing the matrix of storage bins in the storage device.

The alternative level code card shown in FIG. 13 consists of a rectangular non-metallic mounting plate 100 also provided with a series of magnet receiving slots in positions marked A–F, and each level code card contains a pair of magnets 101 and 102 mounted in a selected pair of slots to define the level codes shown in FIG. 15 — level code AE being indicated in the code card shown in FIG. 13. Each level code card also includes a pair of read-now commnd magnets 103 and 104 mounted in transversely spaced relation to the code magnets 101 and 102, the magnet 103 also serving as a retrieve and store position command magnet.

Figure 13A:
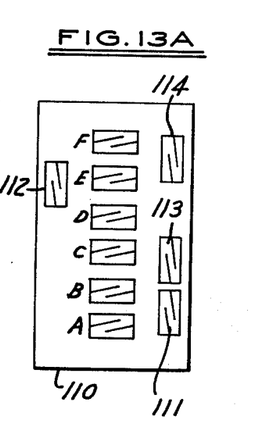
FIG. 13A schematically illustrates a reader for the code card of FIG. 13.

The construction of column readers and level readers used with the code cards of FIGS. 12 and 13 is indicated in FIGS. 12A and 13A, respectively. In FIG. 12A, a column reader 106 is provided with reed switches A–E mounted in positions corresponding to each of the positions A–E of the code card shown in FIG. 12, and with a pair of read-now command reed switches 108 and 109 mounted in positions corresponding to the read-now magnets 97 and 98.

A level code card reader 110 of FIG. 13A has reed switches A–F mounted in positions corresponding to each of the permanent magnet positions A–F of the code card of FIG. 13, a pair of read-now command reed switches 111 and 112 mounted in positions corresponding to those of the magnets 103 and 104 of FIG. 13, a store command reed switch 113 and a retrieve command reed switch 114, the switches 113 and 114 being mounted in positions in which these reed switches are actuatable by the command magnet 103. These reed switches 113 and 114 are selectively employed as control elements in the storage and retrieval modes of operation of the machine, respectively. Command magnet 103 is also used in conjunction with the reed switches 113 and 114, when the table 44 of the storage machine is extended, to control the upward or downward movements of the elevator necessary to lift a load in a storage bin 38 during a retrieval operation or to deposit a load on a storage bin 38 during a storage operation.

The column and level code cards and readers of FIGS. 12–13A are preferred, and their functioning is summrized as follows:

1. For the column code card of FIG. 12 and reader of FIG. 12A, the simultaneous operation of the reed switches 108 and 109 by a pair of read-now command magnets 97 and 98 signals a centered position of the carriage 40 relative to a column and commands the control system to interrogate the code magnets 95 and 96 with the reed switches A–E of the reader to determine the column position of the carriage 40.

2. For the level code cards of FIG. 13 and reader of FIG. 13A—
   (a) the simultaneous operation of the reed switches 111 and 112 by the read-now command magnets 103 and 104 instructs the control system to have the reed switches A-F interrogate the code magnets 101 and 102 to determine the storage level of the elevator 42;
   (b) in the storage mode of operation, actuation of the reed switch 113 by the command magnet 103 directs the control system to stop vertical motion of the elevator at the storage level of the desired storage bin;
   (c) in the retrieval mode of operation, actuation of the reed switch 114 by the command magnet 103 directs the control system to stop vertical motion of the elevator at the retrieve level of the desired storage bin;
   (d) when the table 44 of the storage machine is extended in the storage mode of operation, actuation of the reed switch 114 by the command magnet 103 directs the control system to stop downward movement of the elevator 42 after a load has been deposited in the desired storage bin; and,
   (e) when the table 44 is extended in the retrieval mode of operation, actuation of the reed switch 113 by the command magnet 103 directs the control system to stop upward movement of the elevator after a load has been picked up from the desired storage bin.

Means for controlling the storage machine and system of the invention employing the preferred code cards and readers described above, are illustrated schematically in FIGS. 14–16. These control means enable the operation of the storage machine in a storage mode in which unit loads of articles are taken from the transfer station 30 and are successively placed in a predetermined sequence of storage bins 38, and in a retrieval mode in which unit loads of articles are removed from the storage bins in the reverse of that sequence and are deposited on the transfer station 30. The predetermined sequence is one in which unit loads of articles are stored in the storage bins 38 progressively in one of the horizontal and vertical directions in which the storage bins are arranged in the matrix of the storage device 26.

Figure 14:
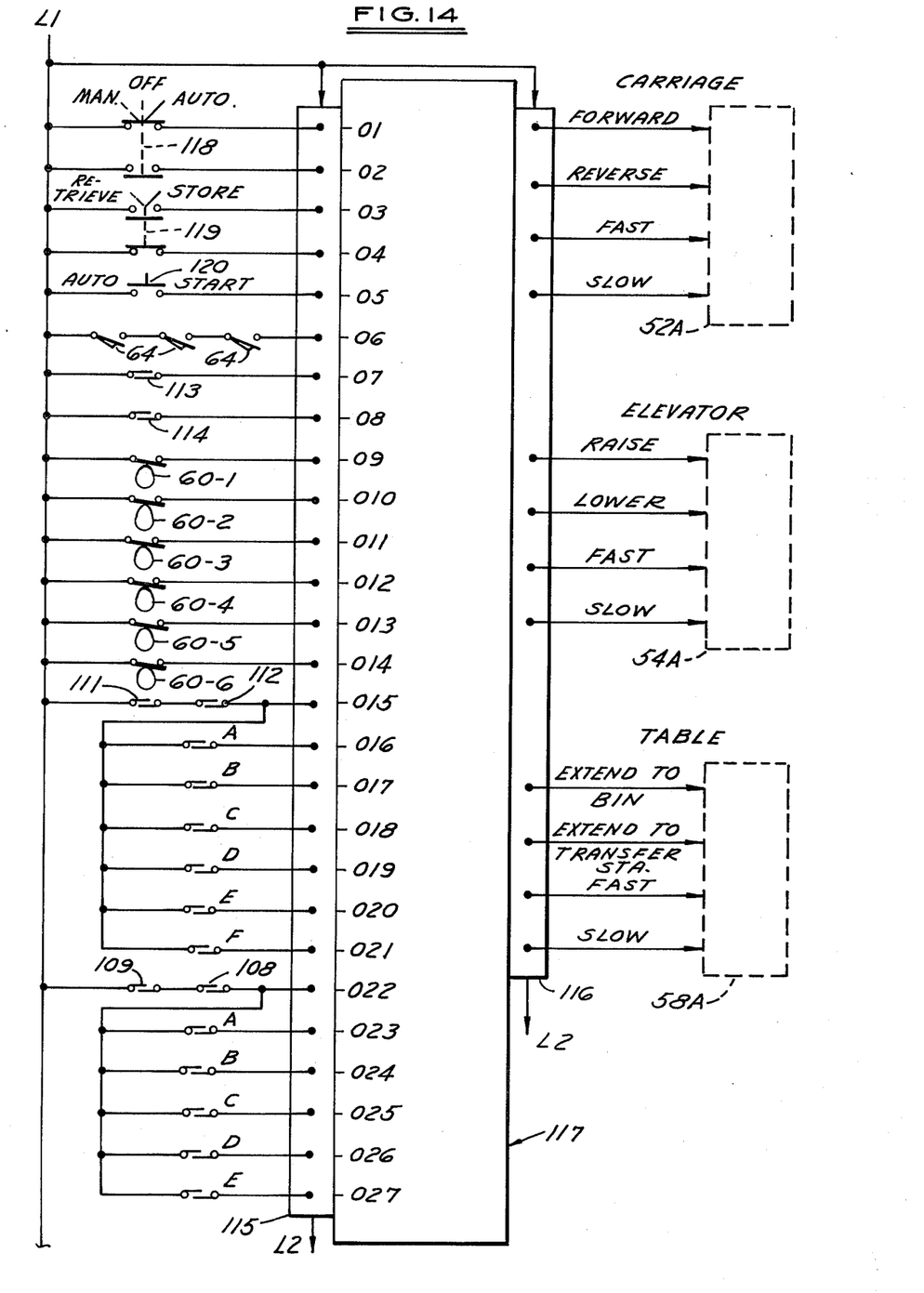
FIG. 14 is a block diagram illustrating the basic components of the control for the storage machine.

The principal components of the control system and their relationship are illustrated in FIG. 14. A programmable processor 117, such as the Model PLC-2 processor manufactured by Allen-Bradley Company, is employed together with a suitable input module 115 and an output module 116. The input module 115 is provided with input signals from the column code card reader 72, the level code card reader 84, switch elements 60-1 —60-6 of the cam switch 60 operated by the table drive motor 58, and the sensing switches 64 of the transfer table 30. The output module 116 provides the indicated output signals to control circuits 52A, 54A and 58A for the carriage drive motor 52, the elevator drive motor 54 and the table drive motor 58, respectively. The terminals of the input module 115 are numbered 01 through 027 and the input function provided by each is tabulated below together with the associated control element.

| Terminal | Control Element | Input Function |
| --- | --- | --- |
| 01 | Selector switch 118 | Machine in automatic mode |
| 02 | Selector switch 118 | Machine in manual mode |
| 03 | Selector switch 119 | Machine in retrieve mode |
| 04 | Selector switch 119 | Machine in storage mode |
| 05 | Push button switch 120 | Automatic mode start |
| 06 | Sensing switches 64 | Articles present at transfer station 30 |
| 07 | Reed switch 113 | Elevator at storage level |
| 08 | Reed switch 114 | Elevator at retrieval level |
| 09 | Cam switch 60-1 | Table fully extended to storage bin 38 |
| 010 | Cam switch 60-2 | Table to bin-slow speed |
| 011 | Cam switch 60-3 | Table at center from bin |
| 012 | Cam switch 60-4 | Table at center from transfer station 30 |
| 013 | Cam switch 60-5 | Table to transfer station-slow speed |
| 014 | Cam switch 60-6 | Table fully extended to transfer station |
| 015 | Reed switches 111 and 112 | Read now-level address |
| 016–021 | Level reed switches A-F | Level address Codes A-F |
| 022 | Reed switches 108 and 109 | Read now-column address |
| 023–027 | Column reed switches A-E | Column address codes A-E |

Other inputs to the processor 117 are preferably provided but have not been shown, for simplicity. Such inputs can indicate horizontal overtravel of the carriage, vertical overtravel of the elevator, the presence of a unit load in a storage bin 38 which the table 44 attempts to enter, over-torque condition of any of the drive motors, etc. and the processor 117 is programmed to produce the desired output in response to any of these safety-type inputs. FIG. 14 also does not include the elements for manually controlling the movements of the storage machine.

Figure 16:
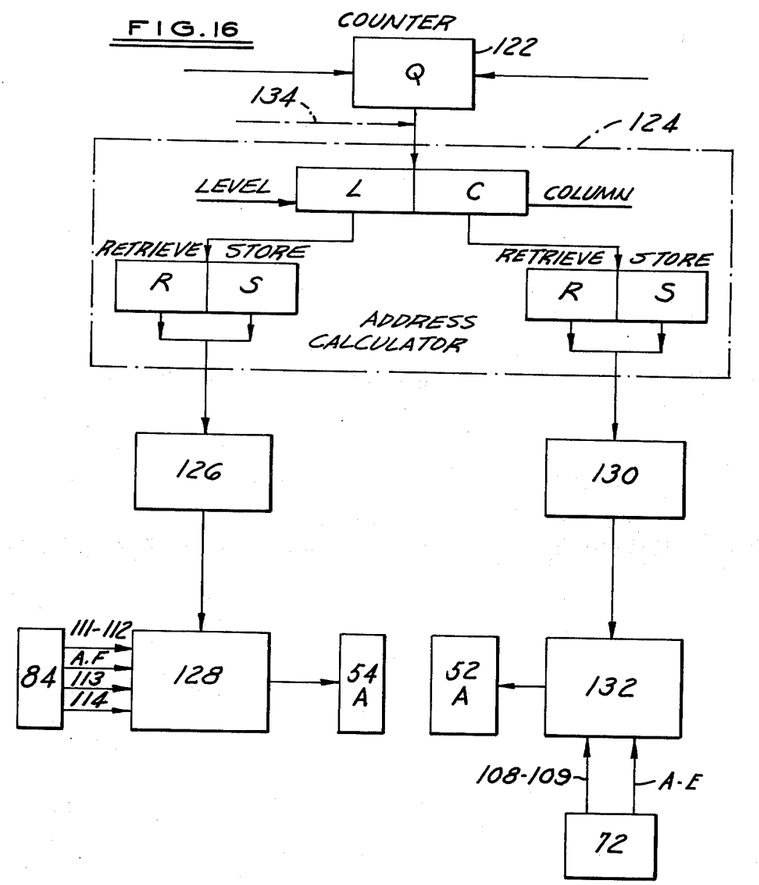
FIG. 16 is a block diagram illustrating the operation of the control system of the storage machine.

The control means contained in the processor 117 and the mode of operation thereof are illustrated in FIG. 16. This mode of operation generally is one in which the processor 117, or programmable means, calculates in the storage and retrieval modes of operation of the storage machine, the column and level address of the next storage bin in the predetermined sequence, and in the reverse of that sequence, as functions of the number of unit loads placed in storage as determined by a counter 122 in the processor 117 and the number of storage bins in one row of the matrix of the storage device 26. The counter 122 registers the control function last performed by the storage machine; i.e., each time a load is stored, the counter adds one to its register and subtracts one from its register each time a load is retrieved. Thus at any moment, the counter 122 registers a number Q equal to the total number of loads in storage.

Referring to FIG. 16, the means in the processor 117 for calculating the next address coordinates by level and column is indicated at the area 124. The level address (L) calculated in either the retrieve (R) or store (S) modes of operation appears at a selection stage 126, representing a selection that is made by the processor of the code or digit which identifies one level in advance of the calculated address. This selected level will be referred to as the anticipating level. A comparison means 128 receives inputs from the level code card reader 84, and when these inputs match the anticipating level address, the comparison means gives an output command to the control circuit 54A for the elevator drive motor 54, slowing the rate of movement of the elevator at the anticipating level. At the next level detected by either the read switch 113 or 114 of the code card reader 84, the comparison means 128 gives an output command to the control circuit 54A for the elevator drive motor 54 stopping the elevator with the table 44 in a storage or retrieval position relative to the selected storage bin.

Similarly, the column address calculated and shown to the right of FIG. 16 appears at a selection stage 130 which determines the anticipating address of one column preceding the calculated address. The calculated and anticipating addresses are internal functions employed in the comparison means 132. When the anticipating address is detected by the column card reader 72, an output from the comparison means 132 to the control circuit 52A for the carriage drive motor 52 decreases the rate of movement of the carriage, and the carriage is then stopped at the calculated column address when that address is detected by the column code card reader 72.

To further describe the control system, the programming and the mode of operation thereof, it will be assumed that the desired predetermined sequence is one in which unit loads are stored in successive levels from top to bottom of each column shown in FIG. 15 and in successive columns from right to left. Referring to FIG. 15, there is a total of 14 levels (LT) in each column, identified 13 to 0, top to bottom; and, there are 8 columns (C) identified 0 to 7, right to left. The first unit load will be stored in level 13, column 0; the 14th unit load in level 0, column 0; the 15th load in level 13, column 1, and so on. By following this sequence, there is always an empty bin below the bin in which a unit load is being stored or from which it is being retrieved, thereby minimizing the likelihood of interference between a unit load in storage and the movements of the table 44 of the storage machine during storage and retrieval operations.

Column (C) and level (L) calculations programmed into the calculating means 124 of the processor 117 for the predetermined sequence described above are illustrated by the following examples, wherein Q equals the number of loads in storage, LT equals the total number of storage levels in each column, the storage device 26 is that shown in FIG. 15 where LT=14; and the home position of the table of the storage machine is at column 0, level 0, opposite the transfer station 30.

1. Column calculation for the next storage function is represented by the formula C=Q÷LT (use only the whole number of the division) e.g. up to 13 loads in storage the column identity is zero (13÷14=0.928, using whole number only, C=0); with 14 to 27 loads, C=1.

2. Column calculation for the next retrieval function is represented by the formula C=(Q−1)÷LT (use only the whole number of the division)

e.g. with 29 loads in storage, the column is C=(29−1)÷14=2.0 (Note, this is the third column from the right in FIG. 15)

e.g. with 16 loads in storage — C=(16−1)÷14=1.142, using whole numbers only, C=1.

3. Level calculation for the next storage function is represented by the formula $$L = LT(C+1) - Q - 1$$

e.g.—with 18 loads in storage, the next storage level is $$L = 14(1+1) - 18 - 1$$

$$L = 28 - 18 - 1 = 9$$

Thus the 19th load is stored on level 9 of column 1 (the second column from the right in FIG. 15).

4. Level calculation for the next retrieval function is represented by the formula $$L = LT(C+1) - Q$$

e.g.—with 18 loads in storage, the next retrieval level is $$L = 14(1+1) - 18$$

$$L = 28 - 18 = 10$$

Thus the 18th load is retrieved from level 10 of column 1.

5. The programmed control functions for the storage operation include the steps of:

(a) calculate the number of the next column address (C);

(b) calculate the number of the anticipating column address (C−1);

(c) combine the internal function (C−1) with the reed switch inputs for the code of the anticipating address to provide a slow output signal to the carriage drive motor control circuit 52A in response to the code inputs and the internal function — e.g. if (C−1)=1(Code AC), input 022 and input 023 and input 025 (FIG. 14) and the internal function 1 provides slow output;

(d) combine the internal function (C) with the reed switch inputs for the code of the column address to stop the carriage drive motor in response thereto — e.g. if C=2 (Code AD), input 022 and input 023 and input 026 and the internal function 2 provide the stop command;

(e) calculate the number of the next level address (L);

(f) calculate the number of the anticipating level address (L−1);

(g) combine the internal function (L−1) with the reed switch inputs for the code of the anticipating address, as in (c) above, to provide a slow output signal to the elevator drive motor control circuit 54A in response thereto — e.g. if L−1=8 (Code CD), then input 015 and input 018 and input 019 and the internal function 8 provides slow output command;

(h) combine the internal function 8 with the input 07 from reed switch 113 to stop the elevator drive motor at the storage level.

The programming of the control functions for the retrieval operation, and the control functions for operating the other components of the storage machine in the necessary sequence for the storage and retrieval modes will be apparent to one skilled in the art from the foregoing description and from the inputs to the processor 117 shown in FIG. 14.

The use of a retrieval sequence which is the reverse of the storage sequence results in a last-in, first-out (LIFO) control over the inventory of unit loads in the storage device 26. If desired, the processor 117 can be programmed so that the retrieval sequence is one other than the reverse of the storage sequence. For example, the retrieval sequence may be the same as the storage sequence, thereby obtaining a first-in, first-out (FIFO) inventory control.

It will be appreciated that the concept of control provided by the invention is based upon a numerical value Q which represents a load number or storage bin number. This number is convertible by the programmable means 117 into a certain column and level address of a storage device in accordance with the column and level configuration thereof. While the numerical value of Q is obtained from the counter 122 in the example specifically described, it will be apparent that a signal indicative of this value may be supplied to the processor 117 from an external source, such as a manual keyboard or a computer, as indicated by the broken line 134 in FIG. 16.

A Q value or successive values may be employed for any address or sequence of addresses desired; and for selected areas of the storage device 26 so that certain unit loads of articles can be segregated from other unit loads, for example, where there is a difference in the articles, from time to time, passing through the processing system.

Figure 1A:
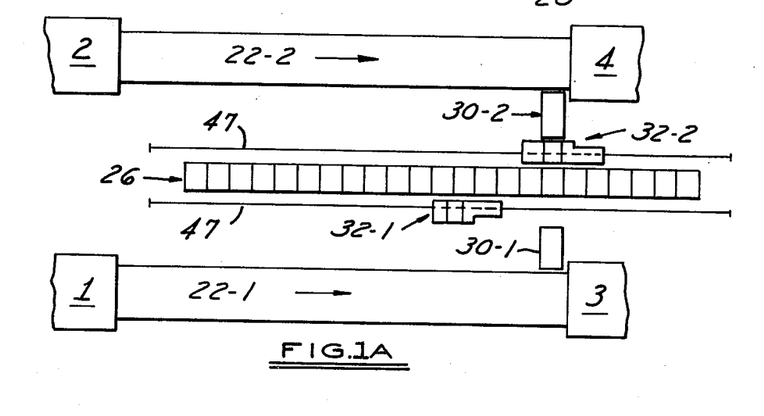
FIG. 1A is a plan view, similar to FIG. 1 but on a smaller scale, illustrating an alternative system of the invention.

The versatility of the system of the invention is further apparent from the arrangement illustrated in FIG. 1A. Four production lines 1–4 are tied together by a buffer system consisting of a storage device 26, transfer stations 30-1 and 30-2 and storage machines 32-1 and 32-2. Articles from production line 1 are transferable into the storage device 26 through transfer station 30-1 by the storage machine 32-1. These articles are subsequently retrievable by either or both of the storage machines 32-1 and 32-2. Articles retrieved by the machine 32-1 are supplied to production line 3, and articles retrieved by storage machine 32-2 are supplied to production line 4. Likewise, articles from production line 2 can be stored and subsequently supplied to lines 3 or 4 by the selective operation of the machines 32-1 and 32-2.

We claim:

1. In an article processing system including a first processing means, a second processing means, and means for conveying articles from said first to said second processing means, the improvement comprising:

an article storage device having a plurality of storage bins for receiving and accumulating unit loads of articles, said storage device being formed by a rack structure having a pair of oppositely facing sides with said storage bins extending between said sides and being accessible from either side;

a third processing means;

transfer means including a first storage and retrieval machine for transferring articles between said conveying means and said storage device, and a second storage and retrieval machine for transferring articles from said storage device to said third processing means, one of said storage and retrieval machines being arranged adjacent to each side of said rack structure; and, control means for operating said first machine in a storage mode in which unit loads of articles are successively placed in said storage bins, and in a retrieval mode in which unit loads of articles are removed from said storage bins.

2. An article processing system as defined in claim 1 further comprising a fourth processing means, an article conveyor from said fourth to said third processing means, and wherein said second storage and retrieval machine is arranged to transfer articles from said article conveyor to said storage device.

3. An article processing system as defined in claims 1 or 2 wherein said transfer means includes a transfer station adapted to accumulate a group of articles from said conveying means to form each of said unit loads, and said control means includes sensing means for initiating a storage mode of operation of said machine in response to the presence of a unit load at said transfer station.

4. An article processing system as defined in claim 3 wherein said transfer station includes means for supporting a number of articles in excess of the number in said group.

5. In an article storage and retrieval machine for use with a storage device having horizontal and vertical rows of storage bins arranged in a plurality of columns and levels defining a matrix of storage bins, said machine having a carriage supported for horizontal movement, a carriage drive motor, an elevator supported on the carriage for vertical movement, an elevator drive motor, an article carrying table supported on the elevator for lateral movement, and a table drive motor, the improvement comprising:

control means for operating said machine in storage and retrieval modes, said control means including programmable means for calculating control functions indicative of the column and level address of a storage bin in said storage device from a load number and the number of storage bins in one of said horizontal and vertical rows, input means responsive to the location of said carriage and said elevator relative to the columns and levels in said storage device, and comparison means for controlling the operation of said carriage and elevator drive motors in response to combinations of said control functions and signals from said input means.

6. An article storage and retrieval machine as defined in claim 5 wherein said control means includes counting means for determining said load number in accordance with the number of loads placed in and removed from said storage device in the storage and retrieval modes of operation of said machine.

7. An article storage and retrieval machine as defined in claim 5 wherein said control means includes means for supplying a signal indicative of said load number from an external source.

8. An article storage and retrieval machine as defined in claim 5 wherein said programmable means includes means for calculating said column and level address in accordance with a predetermined storage sequence and retrieval sequence of storage bins in the storage and retrieval modes of operation, respectively.

9. An article storage and retrieval machine as defined in claim 8 wherein said retrieval sequence is the same as said storage sequence.

10. An article storage and retrieval machine as defined in claim 8 wherein said retrieval sequence is the reverse of said storage sequence.

11. An article storage and retrieval machine as defined in claim 8 wherein said input means includes reading means on said machine for detecting each column and level address in said matrix of storage bins, said programmable means including means for selecting the column and level address next preceding the calculated column and level address in said predetermined sequence, said comparison means providing output signals for slowing the carriage and elevator drive motors in response to the detected address corresponding with the selected address.

12. An article storage and retrieval machine as defined in claim 8 or 11 wherein said predetermined storage sequence is one in which articles are stored in successive levels of storage bins from top to bottom of each column of the matrix of storage bins.

13. An article storage and retrieval machine as defined in claim 12 wherein said retrieval sequence is the reverse of said storage sequence.

14. An article storage and retrieval machine as defined in claim 11 further comprising code cards identifying the columns and levels of said matrix, said column code cards each including a pair of horizontally spaced magnets, said level code cards each including a pair of vertically spaced magnets, and wherein said reading means comprises a column code card reader mounted on said carriage and a level code card reader mounted on said elevator, said column code card reader having a pair of switches operable in overlapping time relation by a pair of column code card magnets to provide an input signal, and said level code card reader having a storage level indicating switch operable by one of said level code card magnets and a retrieval level indicating switch operable by the other of said level code card magnets to provide an input signal in the storage and retrieval modes of operation of said machine.

15. An article storage and retrieval machine as defined in claim 11 further comprising code cards identifying the columns and levels of said matrix, each code card having a plurality of code magnets arranged in a unique code, and wherein said reading means comprises a column code card reader mounted on said carriage and a level code card reader mounted on said elevator, each of said readers having a plurality of code switch means each responsive to one code magnet for providing input signals indicative of each code.

16. An article storage and retrieval machine as defined in claim 15 wherein each column code card includes a pair of read-now command magnets separate from said code magnets, and said column code card reader includes a pair of switches operable in overlapping timed relation by said read-now command magnets in response to a predetermined relative position between the column code card reader and a column code card, said pair of switches being arranged to control the timing of the input signals provided by said code switch means.

17. An article storage and retrievel machine as defined in claim 15 wherein each level code card includes a position indicating magnet separate from said code magnets, and said level code card reader includes a pair of vertically spaced position indicating switch means operable by said position indicating magnet for selectively indicating a storage or a retrieval position of the elevator relative to a storage bin.

* * * * *